Nov. 16, 1948.　　　C. W. ARMSTRONG ET AL　　　2,453,693
AUTOMATIC DIAPHRAGM CONTROL
Filed Sept. 3, 1946 contacts 18 are magnetic

INVENTORS
C. W. ARMSTRONG
CHARLES SADOWSKY
L. S. HETHERINGTON
BY
ATTORNEYS reset magnet 22 and fingers 21 reset needle 17 once per revolution of shaft 10

Patented Nov. 16, 1948

2,453,693

UNITED STATES PATENT OFFICE 2,453,693

AUTOMATIC DIAPHRAGM CONTROL

Charles W. Armstrong, Milford, Charles Sadowsky, New York, and Lionel S. Hetherington, Rockville Centre, N. Y.

Application September 3, 1946, Serial No. 694,444

4 Claims. (Cl. 95—64)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a new and improved automatic diaphragm control for gun cameras and the like.

In using gun cameras on airplanes because of the varying light conditions that must be met in aerial photography, it is very difficult and often impossible for ground crew members to predict the light conditions under which the camera will be required to operate and to make the correct aperture setting for that condition.

It is an object of this invention to provide a device for automatically setting a camera aperture in accordance with the reflected light to which a photoelectric cell within the camera is exposed.

Another object of the invention is to provide an automatic diaphragm control that is of simple construction, sturdy, yet light and inexpensive to manufacture and which can be attached directly to the present gun camera now in common use with slight modification and can be attached to almost any other camera with a similar modification.

Other and further objects and advantages of the present invention will be apparent to those skilled in the art from a consideration of the following description of a specific embodiment of the invention shown in the accompanying drawings wherein.

Figure 1:
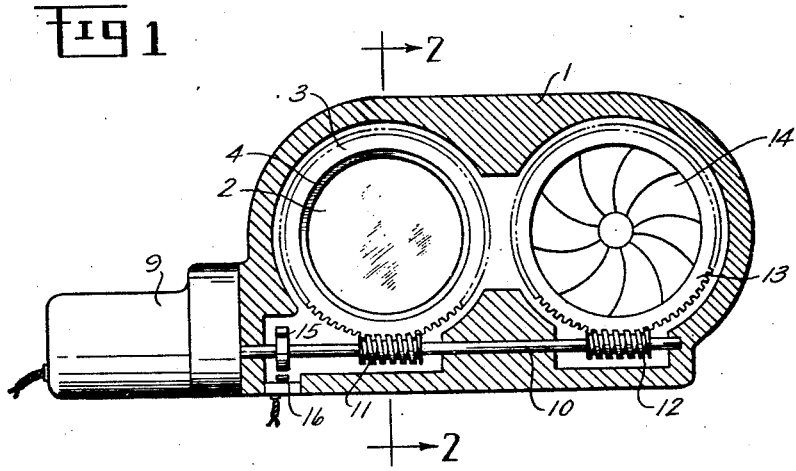
Fig. 1 is an elevational frontal view partly in section.
Figure 2:
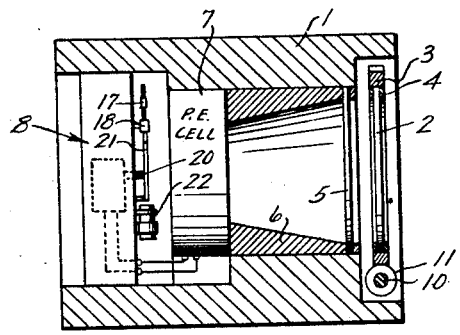
Fig. 2 is an elevational sectional side view taken on the line 2—2 of Fig. 1.
Figure 3:
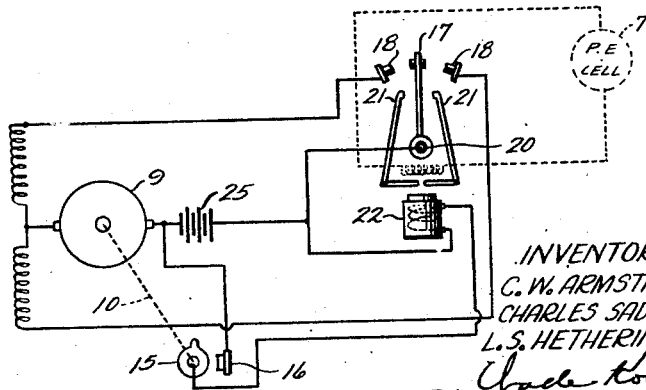
Fig. 3 is a diagrammatic illustration of the complete electrical system.

Referring more specifically to the drawing, numeral 1 designates a housing that may be mounted in or from a part of the conventional camera casing. Within the housing 1 is a rotatable light polarizing disc 2 made of any suitable polarizing material having the gear faced ring 3 circumscribed thereon and the retainer ring 4 holding said rotatable polarizing disc 2 in position. Immediately adjacent said rotatable polarizing disc 2 is a fixed polarizing disc 5 mounted in the forward end of a light baffle 6. Said polarizing discs are constructed to permit free passage of horizontal rays of light through said discs when the planes of said discs are in alignment. Upon rotation of said discs relative to each other, the passage of light will be gradually blocked until it is entirely restricted from passing through said discs. The light baffle 6 directs incident light to the photoelectric cell 7 of conventional construction. Any suitable photoelectric cell may be employed. In the construction shown, a self generating photoelectric cell 7, such as the Weston cell is illustrated, which is capable of generating an electric current having a voltage proportional to the intensity of the incident light. The output leads from the cell are directly attached to the moving coil of the sensitive magnetic contact relay meter 8 of conventional construction well known in the art as illustrated in the Letters Patent granted to R. K. Stout, No. 2,331,354, dated October 12, 1943, on Variable speed motor control. Said magnetic contact relay meter 8 has a needle 17 pivotally mounted on a shaft 20 actuated by the moving coil of the meter and has magnetic contacts 18, 18 mounted on either side of the needle 17 which form electrical contacts for completing an electrical circuit through the needle. The said meter has the reset fingers 21, 21 normally biased by springs (not shown) out of engagement with the needle 17 and actuated by an electromagnet 22 for moving said needle out of contact with either of said magnetic contacts 18, 18 back to neutral position. Said meter 8 selectively controls the reversible electric motor 9 which, when energized, rotates the shaft 10, said shaft having the worm 11 which meshes with and actuates the gear toothed periphery of ring 3 to rotate the polarizing disc 2. Said shaft 10 also has the worm 12 which meshes with the gear toothed periphery of ring 13 which is adapted to actuate the conventional iris diaphragm 14 controlling the aperture of a camera lens. Mounted on the shaft 10 is the cam 15 adapted to actuate an electrical switch 16 to energize the electromagnet 22 once during each revolution of the shaft 10. A suitable battery 25 supplies current for operation of the motor 9 and for energizing the resetting electromagnet 22. Any suitable gear train and driving mechanism may be employed to accomplish the simultaneous movement of the disc 2 and iris diaphragm 14.

In use, a suitable voltage is chosen on the low side of the photoelectric cell 7 by fixing a light median such as 50 foot candles to maintain the needle of the meter 8 in neutral position and the rotatable polarizing disc 2 is adjusted to that position. As incident light enters through the polarizing discs 2 and 5 and is directed by the baffle 6 to the photoelectric cell 7, a constant voltage will be maintained through the meter which will maintain the needle 17 in neutral position as long as a light intensity of the selected value, such as 50 foot candles, is maintained. Increasing or decreasing changes in light intensity of 5 foot candles impinging on the photoelectric cell 7 will vary the voltage output of the photoelectric cell sufficient to cause the needle 17 of the meter 8 to swing to one side and be maintained in magnetic contact with the appropriate magnetic contact 18, closing the circuit to the motor 9, energizing said motor and causing the shaft 10 to rotate, which rotation imparts movement through the worm 11 to the rotatable polarizing disc 2 and which imparts movement through the worm 12 to the iris diaphragm 14. Rotation of the disc 2 relative to the disc 5, moves the polarizing axes of the discs further into or out of alignment, increasing or decreasing the light barrier. In the event the light passing through the discs 2 and 5 is of greater intensity than the preselected median, the photoelectric cell will develop an increased voltage, which will ultimately be sufficient to cause the needle 17 of the sensitive relay 8 to deflect from neutral position and moving same to one side where, by magnetic attraction, it is drawn and held in contact with the magnetic contact 18, completing the circuit from the battery 25 through the contact 18 to the motor 9, energizing said motor 9, which drives the shaft 10 and imparts rotation to the rotatable polarizing disc 2 and iris diaphragm 14. This rotation of the polarizing disc 2 will move the polarizing axes of the discs 2 and 5 further out of alignment and will decrease the amount of light passing through said discs 2 and 5 to the photoelectric cell 7. In the event the light striking the photoelectric cell is of less intensity than the preselected median, the output voltage of the photoelectric cell will be decreased so that the needle 17 will move to the opposite side and will be drawn into contact with the opposite magnetic contact 18, closing the circuit through the contact 18 to the motor 9, energizing said motor in reverse, causing the shaft 10 to be rotated in reverse direction and rotating said disc 2 in the reverse direction to bring the polarizing axes of the discs 2 and 5 in closer alignment, permitting a greater intensity of light to pass through said discs to the photoelectric cell 7 and simultaneously increasing the aperture opening of the iris diaphragm 14. Upon completion of one revolution of the shaft 10, the cam 15 will make contact with the switch contact 16 completing the circuit through said connection to the electromagnet 22 which, through magnetic action on the lower ends of the fingers 20, moves the needle 17 back to neutral position breaking the contact and de-energizing the motor 9. This action will be repeated until the rotatable polarizing disc 2 has been moved to a position where the incident light passing through the polarizing discs 2 and 5 to the photoelectric cell 7 has been reduced or increased to the preselected intensity and the voltage output of the cell returned to a value corresponding to the neutral position of the needle 17 and the aperture of the camera thus adjusted to the desired position.

Having thus described our invention what we claim is new and desire to secure by Letters Patent of the United States is:

1. In a control for automatically varying the light aperture of a camera, the combination of a rotatable iris diaphragm for controlling light admission to the camera, a photoelectric cell, a rotatable polarizing diaphragm and a nonrotatable polarizing diaphragm for controlling light admission to the photoelectric cell, a double field coil reversible electric motor, an electrical current source, a rotatable power shaft connecting said motor to said iris diaphragm and said rotatable polarizing diaphragm to rotate them in unison, an ammeter electrically connected to the output circuit of said photoelectric cell and adapted to assume a medial position at a preselected output of said photoelectric cell, a double throw switch adapted by actuation of said ammeter above or below said medial position to direct current to one or the other of said field coils, an electromagnet, a cam operated control switch closable by each rotation of said power shaft to periodically energize said electromagnet, and linkage movable by energization of said electromagnet to intermittently reset said ammeter to its medial position.

2. In a control for automatically varying the light aperture of a camera, the combination of a rotatable diaphragm for controlling light admission to the camera, a photoelectric cell, a second rotatable diaphragm for controlling light admission to the photoelectric cell, an electric motor, selective means to rotate said motor in either direction, an electrical current source, a rotatable power shaft connecting said motor to said diaphragms to rotate them in unison, an ammeter electrically connected to the output circuit of said photoelectric cell and adapted to assume a medial position at a preselected output of said photoelectric cell, a double throw switch adapted by actuation of said ammeter above or below said medial position to operate said selective means, an electromagnet, a control switch closable at each turn of said power shaft to momentarily energize said electromagnet, and linkage movable by energization of said electromagnet to intermittently reset said ammeter to its medial position.

3. In a control for automatically varying the light aperture of a camera, the combination of a rotatable means for controlling light admission to the camera, a photoelectric cell, a second rotatable means for controlling light admission to the photoelectric cell, an electric motor, a reversing means for said motor, an electrical current source, a power transmitting means connecting said motor to said rotatable means to rotate them is unison, an ammeter electrically connected to the output circuit of said photoelectric cell and adapted to assume a medial position at a preselected output of said photoelectric cell, a double throw switch adapted by actuation of said ammeter above or below said medial position to operate said motor reversing means, an electromagnet, a control switch closable by operation of said power transmitting means to periodically energize said electromagnet, and linkage movable by energization of said electromagnet to intermittently reset said ammeter to its medial position.

4. In a control for automatically varying the light aperture of a camera, power actuated means for controlling light admission to the camera, a photoelectric cell, a second power actuated means for controlling light admission to the photoelectric cell, a power source, reversing means for said power source, power transmitting means connecting said power source to said power actuated means to rotate them in unison, an ammeter electrically connected to the output circuit of said photoelectric cell and adapted to asume a medial position at a preselected output of said photoelectric cell, means adapted by actuation of said ammeter away from said medial position to operate said reversing means, an electromagnet, a control switch closable by actuation of said power transmitting means to periodically energize said electromagnet, and linkage movable by energization of said electromagnet to intermittently reset said ammeter to its medial position.

CHARLES W. ARMSTRONG.
CHARLES SADOWSKY.
LIONEL S. HETHERINGTON.

REFERENCES CITED

The following references are of record in the file of this patent:

UNITED STATES PATENTS

| Number | Name | Date |
|---|---|---|
| 2,145,914 | Bartels | Feb. 7, 1939 |

FOREIGN PATENTS

| Number | Country | Date |
|---|---|---|
| 763,279 | France | Feb. 12, 1934 |
| 821,026 | France | Aug. 17, 1937 |
| 649,259 | Germany | Aug. 19, 1937 |
| 491,410 | Great Britain | Sept. 1, 1938 |